(12) United States Patent
Benisty et al.

(10) Patent No.: US 11,763,040 B2
(45) Date of Patent: Sep. 19, 2023

(54) ENHANCED D3-COLD AND FASTER RECOVERY

(71) Applicant: Western Digital Technologies, Inc., San Jose, CA (US)

(72) Inventors: Shay Benisty, Beer Sheva (IL); Judah Gamliel Hahn, Ofra (IL); Ariel Navon, Revava (IL)

(73) Assignee: Western Digital Technologies, Inc., San Jose, CA (US)

(*) Notice: Subject to any disclaimer, the term of this patent is extended or adjusted under 35 U.S.C. 154(b) by 73 days.

(21) Appl. No.: 17/224,732

(22) Filed: Apr. 7, 2021

(65) Prior Publication Data

US 2022/0327244 A1    Oct. 13, 2022

(51) Int. Cl.
G06F 21/78    (2013.01)
G06F 21/57    (2013.01)
G06F 1/3234    (2019.01)
G06F 21/60    (2013.01)

(52) U.S. Cl.
CPC ............ G06F 21/78 (2013.01); G06F 1/3268 (2013.01); G06F 21/575 (2013.01); G06F 21/602 (2013.01); *G06F 2221/0751* (2013.01)

(58) Field of Classification Search
CPC ...... G06F 21/78; G06F 1/3268; G06F 21/575; G06F 21/602; G06F 2221/0751
See application file for complete search history.

(56) References Cited

U.S. PATENT DOCUMENTS

| 10,055,236 | B2 | 8/2018 | Erez et al. |
| 10,466,917 | B2 | 11/2019 | Loewen et al. |
| 10,552,085 | B1* | 2/2020 | Chen ................... G06F 3/0647 |
| 10,558,576 | B2 | 2/2020 | Gopalakrishnan et al. |
| 2006/0265612 | A1* | 11/2006 | Tseng ................... H04L 69/14 713/300 |
| 2014/0281639 | A1* | 9/2014 | Wagh ................... G06F 1/3206 713/324 |
| 2016/0034221 | A1 | 2/2016 | Zettsu et al. |
| 2017/0242606 | A1 | 8/2017 | Vlaiko et al. |
| 2018/0107417 | A1 | 4/2018 | Shechter et al. |

(Continued)

OTHER PUBLICATIONS

Gerald Houlder, "End to End Data Protection presentation", Technical Committee T10 (Year: 2003).*

(Continued)

*Primary Examiner* — Theodore C Parsons
*Assistant Examiner* — Alan L Kong
(74) *Attorney, Agent, or Firm* — PATTERSON & SHERIDAN, LLP; Steven H. VerSteeg

(57) ABSTRACT

A data storage device includes a memory device, an always on (AON) application specific integrated circuit (ASIC), and a controller coupled to the memory device and the AON ASIC. When the data storage device enters a low power state, the controller generates and stores security data associated with context data in a power management integrated circuit (PMIC). The context data is stored in both the memory device and a host memory buffer (HMB). A location of the context data in the HMB is stored in the PMIC with the security data. When the data storage device exits the low power state, the address stored in the PMIC is utilized to retrieve the context data from the HMB. The retrieved context data is verified against the security data by the controller.

19 Claims, 3 Drawing Sheets

(56) References Cited

U.S. PATENT DOCUMENTS

| | | | | |
|---|---|---|---|---|
| 2018/0204006 A1* | 7/2018 | Barr | .................. | G06F 21/575 |
| 2018/0232169 A1* | 8/2018 | Liang | .................. | G06F 3/0629 |
| 2018/0260151 A1* | 9/2018 | Hsu | .................. | G06F 3/0673 |
| 2019/0033951 A1* | 1/2019 | Vui | .................. | G06F 1/26 |
| 2019/0114177 A1* | 4/2019 | Chung | .................. | G06F 9/4403 |
| 2020/0050252 A1* | 2/2020 | Rowley | .................. | G11C 16/30 |
| 2021/0064257 A1 | 3/2021 | Cariello | | |
| 2021/0073404 A1* | 3/2021 | Sakata | .................. | G06F 21/79 |
| 2021/0271412 A1* | 9/2021 | Cheong | .................. | G06F 3/0656 |

OTHER PUBLICATIONS

International Search Report and Written Opinion for Application No. PCT/US2022/013354 dated May 10, 2022.
Device Power States—Windows drivers | Microsoft Docs, https://docs.microsoft.com/en-us/windows-hardware/drivers/kernel/device-power-states, Jun. 16, 2017, 4 pp.
Device Low-Power States—Windows drivers | Microsoft Docs, https://https://docs.microsoft.com/en-us/windows-hardware/drivers/kernel/device-sleeping-states, Jun. 16, 2017, 7 pp.

* cited by examiner

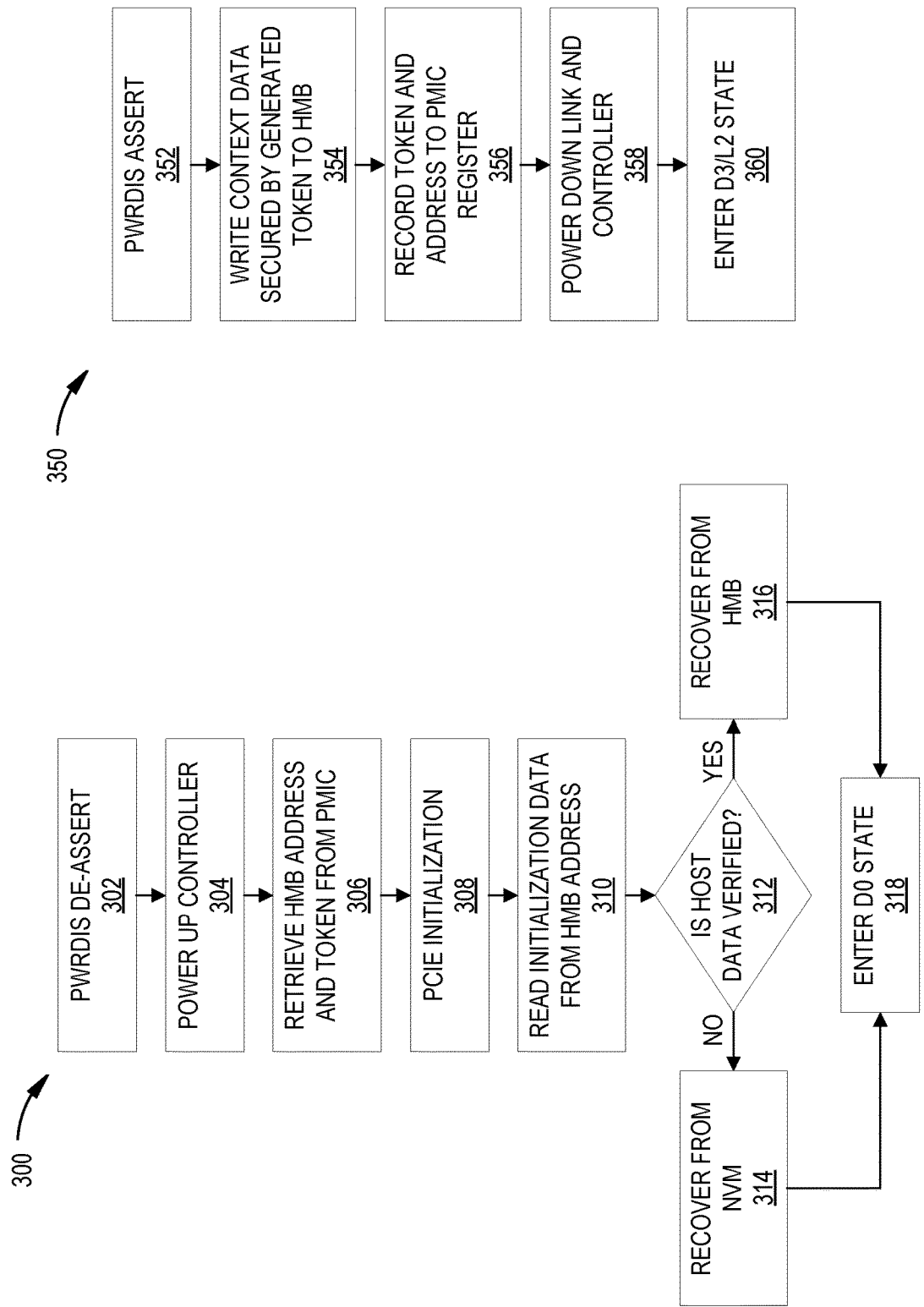

ENHANCED D3-COLD AND FASTER RECOVERY

BACKGROUND OF THE DISCLOSURE

Field of the Disclosure

Embodiments of the present disclosure generally relate to data storage devices, such as solid state drives (SSDs), and power state transition operations.

Description of the Related Art

During operation, data storage devices have various power states, such as an active power state and an idle power state. When the data storage device enters an idle power state or shuts down (i.e., no power is supplied to the data storage device), the initialization time to return or restore to an active power state may depend on the speed at which boot processes may occur. After the boot processes have completed, first host commands may be executed. However, before the boot processes have been completed, the first host commands remain in a queue and are not serviced.

During the restore process (i.e., waking up for an idle power state or waking up from being shutdown), the boot process may be completed from the internal media, such as the non-volatile memory, from a host memory buffer (HMB), or jointly from the internal media and the HMB. However, when booting from the HMB, the HMB is inaccessible until the host device provides the address as part of the non-volatile memory (NVM) express (NVMe) initialization. Prior to receiving the address, the data storage device initializes itself, where initializing itself includes supplying identification information that may require media access, before receiving the HMB pointers from the host device. Thus, the initialization time is determined from when the data storage device is woken up (i.e., the boot from idle power state or being shutdown) to the time that first host commands may be executed.

Therefore, there is a need in the art for an improved initialization operation to decrease the time to initialize the data storage device.

SUMMARY OF THE DISCLOSURE

The present disclosure generally relates to data storage devices, such as solid state drives (SSDs), and power state transition operations. A data storage device includes a memory device, an always on (AON) application specific integrated circuit (ASIC), and a controller coupled to the memory device and the AON ASIC. When the data storage device enters a low power state, the controller generates and stores security data associated with context data in a power management integrated circuit (PMIC). The context data is stored in both the memory device and a host memory buffer (HMB). A location of the context data in the HMB is stored in the PMIC with the security data. When the data storage device exits the low power state, the address stored in the PMIC is utilized to retrieve the context data from the HMB. The retrieved context data is verified against the security data by the controller.

In one embodiment, a data storage device includes a memory device and a controller coupled to the memory device. The controller includes an always on (AON) application specific integrated circuit (ASIC). The controller is configured to generate first security data associated with context data, store the context data in both the memory device and a host memory buffer (HMB), store the security data and an address of a location of the context data in a power management integrated circuit (PMIC), and verify the context data stored in the HMB using the security data upon data storage device wakeup.

In another embodiment, a data storage device includes a memory device and a controller coupled to the memory device. The controller includes an always on (AON) application specific integrated circuit (ASIC). The controller is configured to determine that a power disable is asserted, write context data to a host memory buffer (HMB) and the memory device, write security data and an HMB address of the context data to a power management integrated circuit (PMIC), retrieve, using the HMB address, the context data from the HMB, and verify the security data against the context data.

In another embodiment, a data storage device includes memory means and controller means coupled to the memory means. The controller means includes an application specific integrated circuit (ASIC) means. The ASIC means is always on (AON). The controller means is configured to generate security data, store context data to a host memory buffer (HMB), store location data corresponding to the context data in the HMB and security data to a power management integrated circuit (PMIC), determine that the context data stored in the HMB matches the security data stored in the PMIC, and boot the data storage device from the HMB upon verifying the context data against the security data.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3A depicts a flowchart illustrating a method of a data storage device initialization operation from a D3/L2 power state, according to certain embodiments.

FIG. 3B depicts a flowchart illustrating a method of a data storage device D3/L2 power state entrance operation, according to certain embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and power state transition operations. A data storage device includes a memory device, an always on (AON) application specific integrated circuit (ASIC), and a controller coupled to the memory device and the AON ASIC. When the data storage device enters a low power state, the controller generates and stores security data associated with context data in a power management integrated circuit (PMIC). The context data is stored in both the memory device and a host memory buffer (HMB). A location of the context data in the HMB is stored in the PMIC with the security data. When the data storage device exits the low power state, the address stored in the PMIC is utilized to retrieve the context data from the HMB. The retrieved context data is verified against the security data by the controller.

Figure 1:
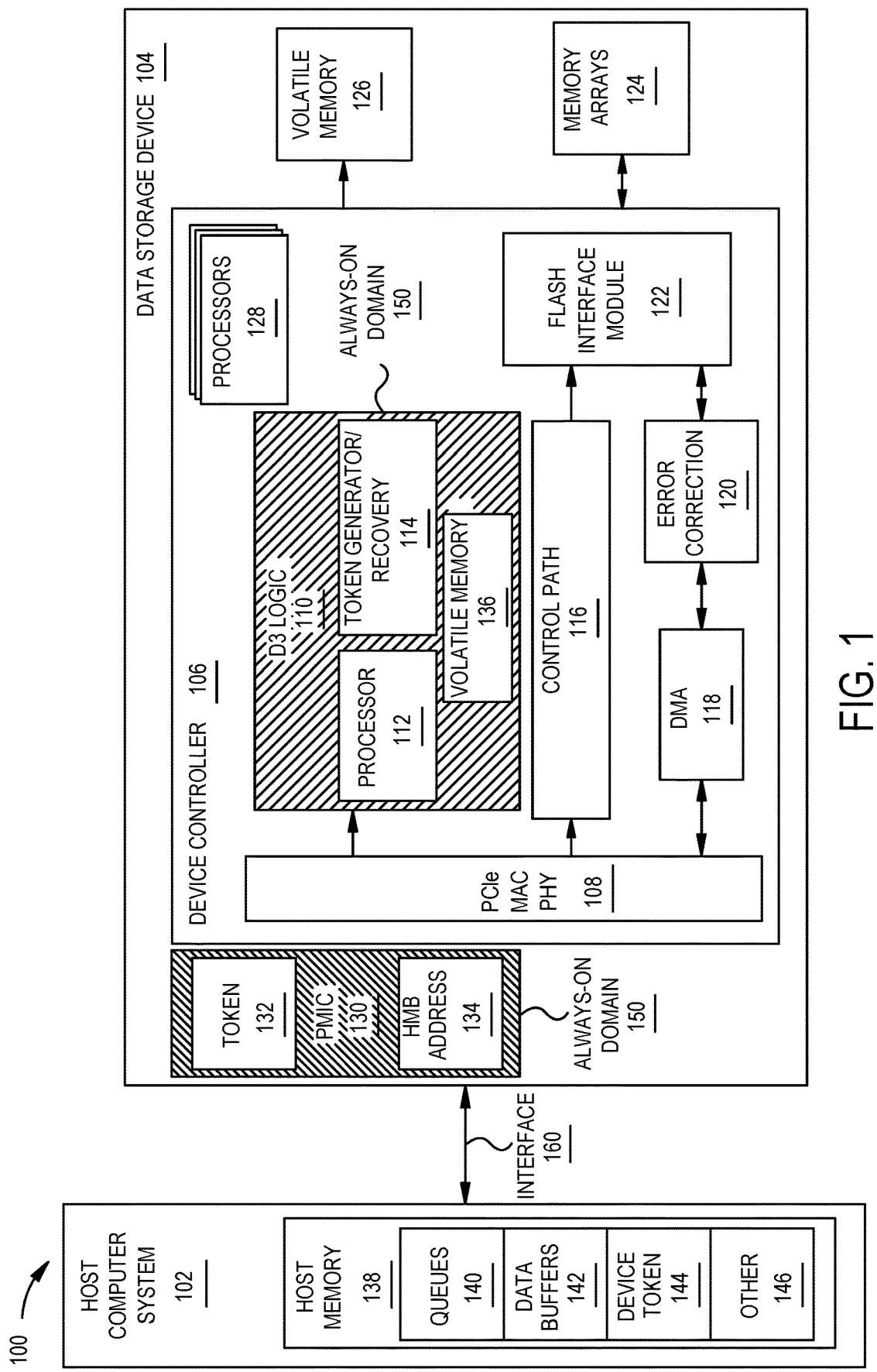
FIG. 1 depicts a schematic illustration of a data storage system, according to certain embodiments.

FIG. 1 depicts a schematic illustration of a data storage system 100, according to certain embodiments. The data storage system 100 includes a host computer system 102 and a data storage device 104. The data storage device 104 may function as a storage device for the host computer system 102. For instance, the host computer system 102 may utilize one or more memory arrays 124, such as NANDs, included in the data storage device 104 to store and retrieve data. In some examples, the data storage system 100 may include a plurality of storage devices, such as the data storage device 104, which may operate as a storage array. For example, the data storage system 100 may include a plurality of data storage devices 104 configured as a redundant array of inexpensive/independent disks (RAID) that collectively function as a mass data storage device for the host computer system 102.

The host computer system 102 includes a host memory 138 that includes one or more queues 140, one or more data buffers 142, a device token area 144, and an "other" area 146. It is to be understood that the "other" area 146 of the host memory 138 includes components not shown for exemplary purposes.

The one or more queues 140 may include a submission queue and a completion queue. The submission queue stores host generated commands, such as read command or write commands, to be sent to the data storage device 104 or retrieved by the data storage device 104. The completion queues stores completion messages generated by the data storage device 104 in response to completing the host generated commands. It is understood that the one or more queues 140 includes other queues besides the completion queues and submission queues and are not shown for exemplary purposes.

The one or more data buffers 142 may hold generated commands and the associated data to be transferred to the data storage device 104. The host computer system 102 may communicate with the data storage device 104 via an interface 160. The host computer system 102 may include any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like. In some examples, the one or more data buffers 142 includes a host memory buffer (HMB) configured to be accessed by the data storage device 104. The HMB is an area of the host memory 138 that may be accessible solely by the data storage device 104.

The device token area 144 stores a device token or security data for data stored in the one or more data buffers 142 of the host memory 138. The device token or security data may be generated by the data storage device 104 for data stored in the HMB area of the one or more data buffers 142.

The data storage device 104 includes a device controller 106, a volatile memory 126, such as a dynamic random-access memory (DRAM), the one or more memory arrays 124, such as one or more non-volatile memories (NVM), and a power management integrated circuit (PMIC) 130. In some examples, the data storage device 104 may include additional components not shown in FIG. 1 for the sake of clarity. For example, the data storage device 104 may include a printed circuit board (PCB) to which components of the data storage device 104 are mechanically attached and which includes electrically conductive traces that electrically interconnect components of the data storage device 104, or the like. In some examples, the physical dimensions and connector configurations of the data storage device 104 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 104 may be directly coupled (e.g., directly soldered) to a motherboard of the host computer system 102.

In some examples, the data storage device 104 may include the interface 160, which may include one or both of a data bus (e.g., an ingress bus and an egress bus) for exchanging data with the host computer system 102 and a control bus for exchanging commands with the host computer system 102. The interface 160 may operate in accordance with any suitable protocol. For example, the interface 160 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface 160 (e.g., the data bus, the control bus, or both) is electrically connected to the device controller 106, providing electrical connection between the host computer system 102 and the device controller 106, allowing data to be exchanged between the host computer system 102 and the device controller 106. In some examples, the electrical connection of the interface 160 may also permit the data storage device 104 to receive power from the host computer system 102. For example, a power supply may receive power from the host computer system 102 via the interface 160.

The one or more memory arrays 124 may be configured to store and/or retrieve data. As described herein, the one or more memory arrays 124 may be referred to as the NVM 124 interchangeably. For example, a memory unit of the NVM 124 may receive data and a message from the device controller 106 that instructs the memory unit to store the data. Similarly, the memory unit of the NVM 124 may receive a message from the device controller 106 that instructs the memory unit to retrieve data. In some examples, each of the memory units may be referred to as a die. In some examples, the NVM 124 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.). In some examples, each memory unit of the NVM 124 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 124 may include a plurality of flash memory devices or memory units. Flash memory devices may include NAND or NOR based flash memory devices and may store data based on a charge contained in a floating gate of a transistor for each flash memory cell. In NAND flash memory devices, the flash memory device may be divided into a plurality of blocks, which may be divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. Furthermore, NAND flash memory devices may be 2D or 3D devices and may be single level cell (SLC), multi-level cell (MLC), triple level cell (TLC), or quad level cell (QLC). The device controller 106 may write data to and read data from NAND flash memory devices at the page level and erase data from NAND flash memory devices at the block level.

In some examples, the data storage device 104 includes a power supply, which may provide power to one or more components of the data storage device 104. When operating in a standard mode, the power supply may provide power to one or more components using power provided by an external device, such as the host computer system 102. For instance, the power supply may provide power to the one or more components using power received from the host computer system via the interface 160 of the data storage device 104. In some examples, the power supply may include one or more power storage components configured to provide power to the one or more components when operating in a shutdown mode, such as where power ceases to be received from the external device. In this way, the power supply may function as an onboard backup power source. Some examples of the one or more power storage components include, but are not limited to, capacitors, supercapacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 126, such as the DRAM or static RAM (SRAM), may be used by the device controller 106 to store information. Furthermore, the volatile memory 126 may be one or more volatile memories. In some examples, the device controller 106 may use volatile memory 126 as a cache. For instance, the device controller 106 may store cached information in volatile memory 126 until cached information is written to the NVM 124. Examples of volatile memory 126 include, but are not limited to, random-access memory (RAM), DRAM, SRAM, and synchronous dynamic RAM (SDRAM (e.g., DDR1, DDR2, DDR3, DDR3L, LPDDR3, DDR4, LPDDR4, and the like)).

The device controller 106 may manage one or more operations of the data storage device 104. For instance, the device controller 106 may manage the reading of data from and/or the writing of data to the NVM 124. In some embodiments, when the data storage device 104 receives a write command from the host computer system 102, the device controller 106 may initiate a data storage command to write data to the NVM 124 and monitor the progress of the data storage command. The device controller 106 may determine at least one operational characteristic of the data storage system 100 and store the at least one operational characteristic to the NVM 124. In some embodiments, when the data storage device 104 receives a write command from the host computer system 102, the controller 106 temporarily stores the data associated with the write command in the internal memory or a write buffer, such as a write cache buffer area of the volatile memory 126, before sending the data to the NVM 124.

The device controller 106 includes a PCIe MAC PHY 108, D3 logic 110, a control path 116, direct memory accesses (DMA) 118, which may be one or more DMAs, an error correction module 120, a flash interface module (FIM) 122, and one or more processors 128. The one or more processors 128 is a chip or a logical circuit that responds and processes commands to operate a computing system, such as the data storage device 104. The one or more processors 128 may perform all mathematical operations and manage the controller operations.

Ingress and egress of data to the data storage device 104 from the host computer system 102 may be performed through the PCIe MAC PHY 108 utilizing the interface 160 for ingress and egress of data between the device controller 106 and the host computer system 102. If commands have been completed by the device controller 106, the data associated with the completed commands may be transferred through the PCIe MAC PHY 108 to the one or more host queues 140 of the host computer system 102.

Data passes from the PCIe MAC PHY 108 to the control path 116 and the DMA 118. The DMA 118 may execute data transfers between host computer system 102 and data storage device 104 without involvement from a host computer system CPU. The control path 116 may be utilized for fetching physical page regions (PRPs), posting completion and interrupts, and activating the DMA 118 for data transfer between host computer system 102 and data storage device 104. The error correction module 120 corrects the data fetched from the memory arrays 124 as well as generates error correction code (ECC) for the data being stored in the memory arrays 124. The device controller 106 may utilize the FIM 122 to interact with the NVM 124 for read and write operations.

The D3 logic 110 includes a processor 112, a token generator/recovery unit 114, and a volatile memory 136. The D3 logic may be an always-on (AON) application specific integrated circuit (ASIC). In some examples, the processor 112 may be a processor of the one or more processors 128 configured to perform the D3 logic. In other examples, the processor 112 is separate from the one or more processors. The token generator/recovery unit 114 generates a token or security data for data stored in the volatile memory 136 to be stored in the HMB when the data storage device 104 enters a low power state mode. The token or security data may include a key or a hash. In some examples the token or security data includes cyclic redundancy code (CRC). The volatile memory 136 may include data responsible for waking up the data storage device 104 from the low power state mode. The data may include all the required information for the boot process.

The data storage device 104 further includes the PMIC 130. The PMIC 130 includes a token area 132 and a HMB address area 134. The token area 132 stores the token or the security data generated by the token generator/recovery unit 114. The token or the security is utilized to verify context data, such as the data of the AON ASIC (i.e., the data stored in the volatile memory 136 utilized for data storage device 104 initialization) stored in the HMB. Likewise, the HMB address area 134 stores the location of the data of the AON ASIC stored in the HMB.

The PMIC 130 and the D3 logic 110 are part of an always-on domain 150. The always-on domain 150 describes areas or components of the data storage device 104, such as the PMIC 130 and the D3 logic 110, that remains powered while the other areas and components of the data storage device 104 are unpowered. For example, when the data storage device 104 enters a $D3_{COLD}$ power state, as described below, the data storage device 104 components, such as the device controller 106, are not powered. However, in a D3/L2 power state, where the D3/L2 power state is an additional state between the $D3_{HOT}$ power state and the $D3_{COLD}$ power state or is a sub-state of the $D3_{COLD}$ power state, certain areas of the data storage device 104, such as only the PMIC 130, may be provided power while the remainder of the data storage device 104 is unpowered.

Referring to FIG. 1, D3 logic 110 and the PMIC 130 are part of the always-on domain 150. However, as part of the D3/L2 power state, the PMIC 130 may remain powered while power to the D3 logic 110 is removed. Because the PMIC 130 is powered while the remainder of the data storage device 104 is unpowered, the device controller 106, during the boot operation or the initialization process, is able to retrieve the context data from the HMB utilizing the address stored in the HMB address area 134. In other embodiments, if the D3 logic 110 remains powered, the context data may be retrieved from the HMB utilizing the address stored in the volatile memory 136. Rather than waiting for the host computer system 102 to send the pointers or the address of the HMB of the one or more data buffers 142, the device controller 106 is made aware of where the context data is stored. Therefore, the device controller 106 is able to retrieve the context data preemptively, verify the context data utilizing the token or security data stored in the token 132, and utilize the context data to initialize the data storage device 104.

Figure 2:
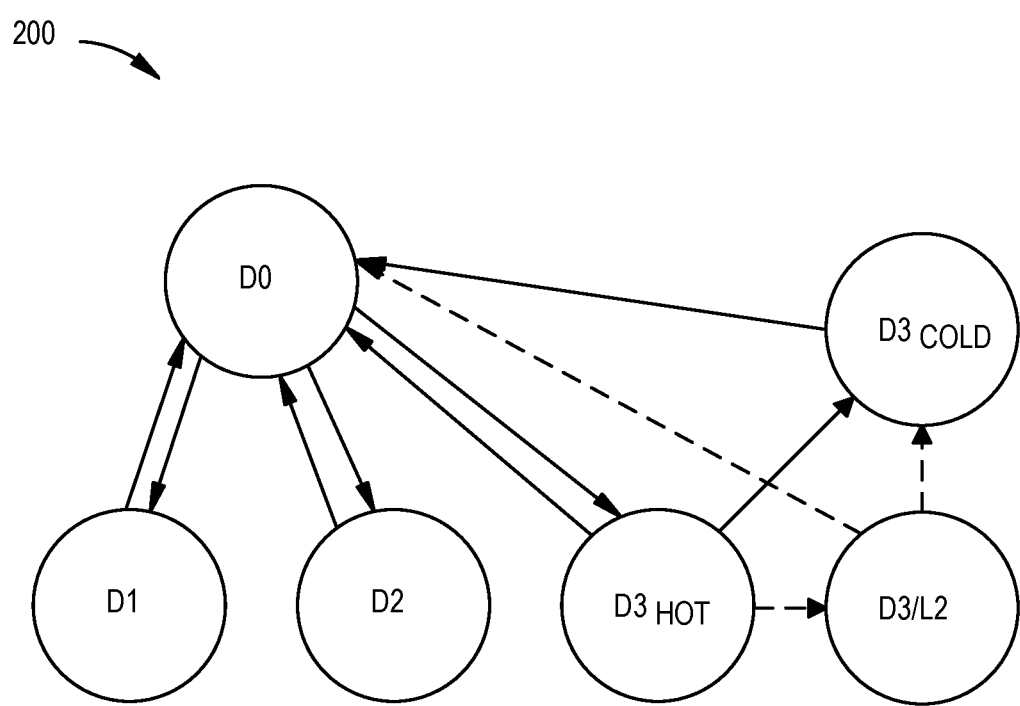
FIG. 2 depicts a schematic flow diagram of a power state diagram of a data storage device, according to certain embodiments.

FIG. 2 depicts a schematic flow diagram of a power state diagram 200 of a data storage device, such as the data storage device 104 of FIG. 1, according to certain embodiments. The data storage device 104 operates at various power states, such as D0, D1, D2, $D3_{HOT}$, and $D3_{COLD}$. Furthermore, the data storage device 104 may operate at additional power state, D3/L2, where a portion of the data storage device 104 remains powered and the other portion is unpowered. It is contemplated that other power states, as well as fewer than or greater than the described number of power states, are applicable to the described embodiments. The host, such as the host computer system 102 of FIG. 1, may provide a suitable amount of power to the data storage device 104 through one or more pins on the interface, such as the interface 160 of FIG. 1.

The suitable amount of power may be more than or equal to the amount of power the data storage device 104 requires to operate. For example, the power a data storage device 104 may receive from the host computer system 102 may be about 5 W. Furthermore, a data storage device 104 may draw out about 500 mW to about 15 W of power from the host computer system 102. The previously mentioned values for power are not intended to be limiting, but to provide a reference.

As mentioned previously, the data storage device 104 may have several power states, such as D0, D1, D2, $D3_{HOT}$, and $D3_{COLD}$. Each of the power states are associated with a distinct data storage device 104 operation. The power states are characterized by the following attributes: power consumption, data storage device context, data storage device driver behavior, restore time, and wake-up capability. Power states are numbered sequentially, where higher numbers represent lower power requirements and corresponding higher exit latencies. Furthermore, each power state has an associated power requirement and an exit latency. As shown in FIG. 2, the data storage device may transition from the D0 to either the D1, the D2, or the $D3_{HOT}$ power states. When the data storage device 104 shuts down, the power state of the data storage device exits from $D3_{HOT}$ and enters $D3_{COLD}$.

The D0 power state is considered a fully operational power state, where the data storage device 104 is fully on and operational. An operational power state refers to the ability of a host computer system 102 to communicate with the data storage device 104 in order to perform input/output (I/O) operations and the data storage device 104 may generate interrupts. Interrupts are an automatic transfer of firmware execution due to a system timer or a user command. The D0 power state has the highest level of continuous power consumption for the data storage device 104. After a period of idle time (e.g., no I/O operations or the like), the host computer system 102 may instruct the data storage device 104 to enter a low power consumption power state, such as the D1, the D2, and the $D3_{HOT}$ power states. When the data storage device 104 is no longer in use, the host computer system 102 may instruct the data storage device 104 to enter a non-operational power state $D3_{COLD}$ from the $D3_{HOT}$ power state to limit idle power consumption to a minimal value. In order for I/O commands to occur, the data storage device is woken up from power states D1, D2, $D3_{HOT}$, and $D3_{COLD}$ and placed into power state D0.

Rather than transitioning from the $D3_{HOT}$ power state to the $D3_{COLD}$ power state, the data storage device 104 may transition to an intermediate power state, the D3/L2 power state. The D3/L2 power state is characterized by the host computer system 102 continuing to provide power to the main power rail. However, in the D3/L2 power state, the power disable (pwrdis) signal is asserted. When the pwrdis signal is asserted, the data storage device 104 is instructed to remove internal power. However, in the D3/L2 power state, certain components, such as a PMIC 130, may continuously receive power from the host computer system 102 while the rest of the data storage device 104 is turned off completely. Because the rest of the data storage device 104 is turn off completely, the default behavior for recovery may be the same as the recovery behavior from the $D3_{COLD}$ power state. In some examples the data storage device 104 may transition from the D3/L2 power state to the $D3_{COLD}$ power state prior to returning to the D0 power state. In other examples, the data storage device 104 may transition from the D3/L2 power state to the D0 power state.

FIG. 3A depicts a flowchart illustrating a method 300 of a data storage device, such as the data storage device 104 of FIG. 1, initialization operation from a D3/L2 power state, according to certain embodiments. Aspects of the data storage system 100 may be referenced in the description of the method 300. At block 302, the power disable (pwrdis) is de-asserted, such that the host computing system 102 power to the data storage device 104 is delivered. Because the data storage device 104 is operating in a D3/L2 power state, certain areas, such as a PMIC 130, are already powered while the rest of the data storage device 104 is powered off at the time of the power disable de-assertion.

At block 304, the power is restored to the device controller 106. When the power is restored to the device controller 106, the HMB address and token/security data are retrieved from the PMIC 130 at block 306. At block 308, the PCIe, such as the PCIe MAC PHY 108, is initialized. Utilizing the HMB address retrieved from the PMIC 130, the context data (e.g., the initialization data) is read from the location corresponding to the HMB address.

At block 312, the context data is verified against the token/security data stored in the token area 132 of the PMIC 130. Utilizing the token/security data, the context data is verified by the token generator/recovery unit 114. If the verification fails, then at block 314, the initialization or the recovery from the low power state (i.e., the D3/L2 state) occurs from a location in the NVM 124 and the device enters the D0 state at block 318. However, if the verification passes, then at block 316, the initialization or the recovery from the lower power state occurs from the HMB of the one or more data buffers 142 of the host memory 138 and the device enters the D0 state at block 318.

FIG. 3B depicts a flowchart illustrating a method of a data storage device, such as the data storage device 104 of FIG. 1, D3/L2 power state entrance operation, according to certain embodiments. Aspects of the data storage system 100 may be referenced in the description of the method 350. At block 352, the pwrdis is asserted. When the pwrdis is asserted, the host computing system 102 stops providing power or provides a minimal amount of power to the data storage device 104.

At block 354, when the device controller 106 detects that the pwrdis has been asserted, such that the data storage device 104 is about to enter a low power state mode, the context data located in the volatile memory 136 of an AON ASIC, such as the D3 logic 110, is written to the HMB of the one or more data buffers 142 of the host memory 138. The detection may be an instruction or indication from the host computer system 102 after a period of idle time. For example, the period of idle time may be a time period of not receiving or executing commands received from the host device. Furthermore, the token generator/recovery unit 114 generates a token or security data corresponding to the context data. At block 356, the token or security data and the location of the context data in the HMB is recorded in the PMIC register. For example, the location of the context data in the HMB is stored in the HMB address area 134 and the token or security data is stored in the token area 132.

At block 348, the link and device controller 106, including the AON ASIC, such as the D3 logic 110, are powered down. At block 360, the data storage device enters the D3/L2 power state. In the D3/L2 power state, the certain always-on domain 150 components, such as the PMIC 130, are still provided power, such that a faster initialization may occur when returning to an active power state.

By providing power to the always-on domain components while the rest of the data storage device is unpowered, a faster boot operation may occur due to a decreased exit latency from a power disable asserted state.

In one embodiment, a data storage device includes a memory device and a controller coupled to the memory device. The controller includes an always on (AON) application specific integrated circuit (ASIC). The controller is configured to generate first security data associated with context data, store the context data in both the memory device and a host memory buffer (HMB), store the security data and an address of a location of the context data in a power management integrated circuit (PMIC), and verify the context data stored in the HMB using the security data upon data storage device wakeup.

The PMIC remains powered while the data storage device is in a D3/L2 power state. The PMIC includes a first storage location and a second storage location. The first storage location includes the location of the context data stored in the HMB and the second storage location includes the security data. The controller is further configured to, upon successfully verifying the context data, boot the data storage device from the HMB. The controller is further configured to, upon unsuccessfully verifying the context data, boot the data storage device from the memory device. The controller includes a security generator. The security generator is configured to generate the security data associated with the context data. The security data is a key, hash, or a token, and wherein the security data comprises cyclic redundancy code (CRC). The controller is further configured to receive an indication to power off. The generating occurs after receiving the indication to power off. The indication is received from a host device after a predetermined period of idle time. The predetermined period of idle time includes a time period of not receiving and executing commands received from the host device.

In another embodiment, a data storage device includes a memory device and a controller coupled to the memory device. The controller includes an always on (AON) application specific integrated circuit (ASIC). The controller is configured to determine that a power disable is asserted, write context data to a host memory buffer (HMB) and the memory device, write security data and an HMB address of the context data to a power management integrated circuit (PMIC), retrieve, using the HMB address, the context data from the HMB, and verify the security data against the context data.

The writing context data, the security data, and the HMB address occurs prior to removing power to the data storage device. The removing power includes supplying power to the PMIC. The controller and the memory device does not receive power after removing power from the data storage device. The controller includes D3 logic. The D3 logic includes one or more processors unique to the D3 logic and a token generator/recovery unit. The token generator/recovery unit is configured to generate and verify the security data. The HMB address is retrieved after power is returned to the controller. The HMB address is used to determine a location of the context data in the HMB. The controller is configured to boot the data storage device from the memory device upon determining that the context data has been moved or invalidated in the HMB. The data storage device is further configured to boot from the HMB upon verifying that the security data matches the context data or boot from the memory device upon verifying that the security data does not match the context data. The controller is further configured to store the security data in the HMB. The security data stored in the HMB is verified against the security data stored in the PMIC.

In another embodiment, a data storage device includes memory means and controller means coupled to the memory means. The controller means includes an application specific integrated circuit (ASIC) means. The ASIC means is always on (AON). The controller means is configured to generate security data, store context data to a host memory buffer (HMB), store location data corresponding to the context data in the HMB and security data to a power management integrated circuit (PMIC), determine that the context data stored in the HMB matches the security data stored in the PMIC, and boot the data storage device from the HMB upon verifying the context data against the security data.

The booting further includes booting the storage device from the memory means upon determining that the context data does not match the security data or determining that the location data is no longer valid. The power is supplied to the PMIC during a time where the power is not supplied to the controller means and the memory means.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
    a memory device; and
    a controller coupled to the memory device, wherein the controller comprises an always on (AON) application specific integrated circuit (ASIC), and wherein the controller is configured to:
        generate first security data associated with context data, wherein the context data is data storage device initialization data;
        store the context data in both the memory device and a host memory buffer (HMB) of a host device;
    store the security data and an address of a location of the context data in a power management integrated circuit (PMIC) of the controller;
        retrieve the context data from the HMB using the address of the location of the context data stored in the PMIC upon data storage device wakeup, wherein the PMIC remains powered while the data storage device is in a D3/L2 power state during the retrieving, and wherein the retrieving occurs without the host device sending pointers for the context data; and
    verify the context data stored in the HMB using the security data responsive to the retrieving.

2. The data storage device of claim 1, wherein the PMIC comprises a first storage location and a second storage location, and wherein the first storage location comprises the location of the context data stored in the HMB and the second storage location comprises the security data.

3. The data storage device of claim 1, wherein the controller is further configured to, upon successfully verifying the context data, boot the data storage device from the HMB.

4. The data storage device of claim 1, wherein the controller is further configured to, upon unsuccessfully verifying the context data, boot the data storage device from the memory device.

5. The data storage device of claim 1, wherein the controller comprises a security generator, and wherein the security generator is configured to generate the security data associated with the context data.

6. The data storage device of claim 5, wherein the security data is a key, hash, or a token, and wherein the security data comprises cyclic redundancy code (CRC).

7. The data storage device of claim 1, wherein the controller is further configured to receive an indication to power off, and wherein the generating occurs after receiving the indication to power off.

8. The data storage device of claim 7, wherein the indication is received from a host device after a predetermined period of idle time, and wherein the predetermined period of idle time comprises a time period of not receiving and executing commands received from the host device.

9. A data storage device, comprising:
    a memory device; and
    a controller coupled to the memory device, wherein the controller comprises an always on (AON) application specific integrated circuit (ASIC), and wherein the controller is configured to:
        determine that a power disable is asserted;
        write context data to a host memory buffer (HMB) of a host device and the memory device, wherein the context data is data storage device initialization data;
        write security data and an HMB address of the context data to a power management integrated circuit (PMIC) of the controller;
        retrieve, using the HMB address stored in the PMIC, the context data from the HMB, wherein the PMIC remains powered while the data storage device is in a D3/L2 power state during the retrieving, and wherein the retrieving occurs without the host device sending pointers for the context data; and
        verify the security data against the context data.

10. The data storage device of claim 9, wherein the writing context data, the security data, and the HMB address occurs prior to removing power to the data storage device.

11. The data storage device of claim 10, wherein removing power comprises supplying power to the PMIC, and wherein the controller and the memory device does not receive power after removing power from the data storage device.

12. The data storage device of claim 9, wherein the controller comprises D3 logic, wherein the D3 logic comprises one or more processors unique to the D3 logic and a token generator/recovery unit, and wherein the token generator/recovery unit is configured to generate and verify the security data.

13. The data storage device of claim 9, wherein the HMB address is retrieved after power is returned to the controller, and wherein the HMB address is used to determine a location of the context data in the HMB.

14. The data storage device of claim 13, wherein the controller is configured to boot the data storage device from the memory device upon determining that the context data has been moved or invalidated in the HMB.

15. The data storage device of claim 9, wherein the data storage device is further configured to:
    boot from the HMB upon verifying that the security data matches the context data; or
    boot from the memory device upon verifying that the security data does not match the context data.

16. The data storage device of claim 9, wherein the controller is further configured to store the security data in the HMB, and wherein the security data stored in the HMB is verified against the security data stored in the PMIC.

17. A data storage device, comprising:
    memory means; and
    controller means coupled to the memory means, wherein the controller means comprises an application specific integrated circuit (ASIC) means, wherein the ASIC means is always on (AON); and wherein the controller means is configured to:

generate security data associated with context data, wherein the context data is data storage device initialization data;

store the context data in a host memory buffer (HMB) of a host device;

store location data corresponding to the context data in the HMB and security data to a power management integrated circuit (PMIC) of the controller;

retrieve the context data from the HMB using the location data, wherein the PMIC remains powered while the data storage device is in a D3/L2 power state during the retrieving, and wherein the retrieving occurs without the host device sending pointers for the context data;

determine that the context data stored in the HMB matches the security data stored in the PMIC; and boot the data storage device from the HMB upon verifying the context data against the security data.

18. The data storage device of claim 17, wherein the booting further comprises booting the storage device from the memory means upon determining that the context data does not match the security data or determining that the location data is no longer valid.

19. The data storage device of claim 17, wherein power is supplied to the PMIC during a time where the power is not supplied to the controller means and the memory means.

* * * * *